United States Patent Office

3,645,962
Patented Feb. 29, 1972

3,645,962
FLAME RETARDANT POLYESTER COMPOSITIONS
Robert J. Schwarz, Wilmington, Del., assignor to Hercules Incorporated, Wilmington, Del.
No Drawing. Filed Feb. 26, 1970, Ser. No. 14,679
Int. Cl. C08g 51/04
U.S. Cl. 260—40 R          6 Claims

ABSTRACT OF THE DISCLOSURE

Linear saturated polyesters and particularly poly(ethylene terephthalate) with improved flame retardancy are provided which contain from 3 to 15% of a homopolyether or copolymer of an oxetane substituted in the three position by 1 or 2 bromomethyl groups or with from 1 to 15% of said polyether and from 0.5 to 5% of an antimony compound.

---

This invention relates to improving the flame retardancy of polyesters without major impairment of the physical and mechanical properties of the polyester and to the improved flame retardant compositions produced thereby.

It is known that the flame retardancy of thermoplastics can be improved by the incorporation of halogen compounds, and particularly chlorinated hydrocarbons therein. Relatively large amounts of the chlorined hydrocarbon and an inorganic flame retardant such as antimony trioxide, however, are required to produce an acceptable flame resistant product.

It is also known that certain bromine compounds are more effective flameproofing agents than the corresponding chlorine compounds, and that flame retardancy can be achieved with much smaller amounts of additives. Most bromine-containing compounds, however, are not stable at the elevated temperatures required for molding or spinning into fibers such polyesters as poly(ethylene terephthalate) and the like.

It is an object of the present invention to provide flame retardant linear saturated polyester compositions using particularly small amounts of flame retardant additives. Another object is to provide compositions which can be molded into flame retardant articles without major impairment of the mechanical and physical properties.

Now in accordance with the present invention it has been found that the aforesaid objects can be achieved through the use of linear saturated polyester compositions which contain as a flame retardant, based on the weight of the composition, from 3 to 15% and preferably from 3 to 10% of a bromine-containing polyether when the polyether is the sole flame retardant or from 1 to 15% and preferably from 1 to 10% of said polyether combined with from 0.5% to 5% of an antimony compound, said polyether having a bromine content of at least 48% and being a polymer of

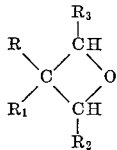

where R is a bromine substituted methyl group, R₁ is R, chloromethyl, alkoxymethyl or an alkyl group, and R₂ and R₃ are hydrogen or an alkyl group.

In the above formula R, as stated is a bromine substituted methyl group and can be —CH₂Br, —CHBr₂ or —CBr₃. R₁, in addition to being chloromethyl, alkoxymethyl or alkyl can also be a bromine substituted methyl group, i.e., a —CH₂Br, —CHBr₂ or —CBr₃ group and can be the same as or difference from the R substituent.

Suitable alkyl groups which R₁, R₂ and R₃ can be will generally contain from 1 to 18 carbon atoms and typically from 1 to 6 carbon atoms. Particularly preferred alkyl groups are methyl, and ethyl groups. Likewise the alkoxy group of the alkoxymethyl substituents which R₁ can comprise will usually contain from 1 to 18 carbon atoms and preferably from 1 to 6 carbon atoms. Ethoxymethyl substituents are particularly preferred.

Thus the invention provides flame retardant compositions from polyesters with very little or no antimony compound, and relatively low amounts of the bromine-containing polyether. Moreover, because of the small amount of flame retardant constituents required; the physical and mechanical properties of the compositions are not impaired to any appreciable extent. The compositions of the invention are suitable for the production of molded articles by the usual processing methods and are particularly suitable for the production of film, fiber and plastic molded articles. Additionally, because the bromine-containing polyether is thermally stable at conventional molding or extrusion temperatures, problems of discoloration and voiding in molded articles, mold corrosion, or loss of additives during processing are not encountered.

The polyethers useful in the present invention contain at least 48% bromine and preferably from 60 to 70% bromine and are homopolymers of an oxetane containing one or two bromine-substituted-methyl groups in the 3-position or copolymers thereof with up to about 50 molar percent of a different epoxide which can be an oxirane or oxetane. Monomers that can be copolymerized with the above mentioned oxetane include the alkylene oxides such as ethylene oxide, propylene oxide, 1-butene oxide, cis and trans 2-butene oxides, isobutylene oxide, 1-hexene oxide; the substituted alkylene oxides such as cyclohexene oxide, epoxycyclooctene, styrene oxide; the alkyl glycidyl ethers such as methyl glycidyl ether, ethyl glycidyl ether, methylethyl glycidyl ether and butyl glycidyl ether; glycidyl ethers of phenol, bis-phenol and the like; unsaturated epoxides such as vinyl cyclohexene mono- and di-oxides, butadiene monoxides, allyl glycidyl ether, allyl phenyl glycidyl ether and crotyl phenyl glycidyl ether; halogen containing epoxides such as epichlorohydrin, epibromohydrin, epifluorohydrin, perfluoropropylene oxide, perfluoroethylene oxide; the cis and trans 1,4-dihalo-2,3-epoxy-butanes; the 1,1,1-trihalo-3,4-epoxy butanes; and a different oxetane which can be oxacyclobutane itself, oxacyclobutane carrying on one or more of the carbon atoms substituents such as halogen, cyanide, hydroxyl, alkoxy, acyloxy, aryloxy, halomethyl, cyanomethyl, hydroxymethyl, alkoxymethyl, acyloxymethyl, aryloxymethyl and the like. Typical polyethers that can be used are those described in U.S. 3,205,-207 and 3,341,475.

The polyethers of the invention will have a weight average molecular weight of at least about 700 and preferably of the order of about 3000 and higher. The polyethers can be prepared in known manner, as by polymerizing the bromo-substituted oxetane or mixtures thereof with a different epoxide using a Friedel-Crafts catalyst or by the procedure described in U.S. 3,205,183.

The polyesters which can be made flame retardant in accordance with this invention are the thermoplastic resins which are the linear, saturated polyesters of aromatic dicarboxylic acids and saturated diols and preferably the polyester of terephthalic acid and ethylene glycol. The polyesters are obtained by known methods from aromatic dicarboxylic acids, preferably terephthalic acid and the lower alkyl esters thereof such as the dimethyl ester of terephthalic acid. The aromatic dicarboxylic acid or its ester is esterified or transesterified and polycondensed with a saturated diol such as ethylene glycol, the resulting polycondensate having an average molecular weight of at least about 10,000, corresponding to an intrinsic viscosity of at least about 0.4 measured as a 1% solution in 60/40 phenol/tetrachloroethane at 25° C. The saturated diols are saturated aliphatic, cycloaliphatic or aromatic diols, preferably the lower alkane diols such as ethylene glycol. Mixtures of acids or saturated diols can also be used. However, it is preferably the lower alkane diols such as ethylene glycol. Mixtures of acids or saturated diols can also be used. However, it is preferred to employ a polyester consisting essentially of poly(ethylene terephthalate), i.e., wherein not more than 10 molar percent, preferably less than 5 molar percent of the monomeric components are derived from sources other than terephthalic acid and ethylene glycol. The preferred poly(ethylene terephthalate)s usually have a molecular weight of at least about 16,000 and an intrinsic viscosity of at least about 0.5.

The polyesters, and particularly those for molding uses can contain reinforcing fillers such as mineral silicates, silica obtained by evaporation of a silica sol, quartz, silica gel, glass fibers, cristobalite, asbestos, clay, talc, etc., which improve the heat and shock resistance, modulus of elasticity, resistance to creep and other properties such as, for example, tensile strength, flexural strength and hardness. Reinforced polyester compositions for molding use preferably contain from about 5 to about 60% and most preferably from about 20 to about 40% by weight of the composition of glass in the form of fibers, strands or rovings having an average length of at least about 1.0 mm.

In addition to the bromine-containing polyether, the composition of the invention can also contain an antimony compound such as antimony trioxide, triphenylstibine, antimony sulfide, antimony naphthenate or the like as flame retardant. The presence of an antimony compound is not essential to flame retardancy. If present the amount of antimony compound will usually be less than 10% and preferably will range from 0.5 to 5% by weight of the composition. Small amounts of stabilizing agents, lubricants, dye additives, pigments, antistatic agents, nucleating agents, and the like can also be present provided of course, that the amount of such additives does not detract from the flame retardancy of the composition.

The compositions of the invention can be prepared by mixing the polyester with the flame retardant, i.e. the bromine-containing polyether and antimony compound, if present, in conventional manner, e.g. on roll mills, kneaders or extruders or by agitating in the presence of an organic solvent. Since uniform mixing of the constituents is essential to reliable results, the mixing operation is preferably carried out by first dry mixing the ingredients and then subjecting the dry mixture to intensive mechanical working at elevated temperatures above the softening point of the polyester and most conveniently by means of compounding rolls, a Banbury mixer or extruder and continuing the working until a uniform mixture is obtained.

The potential flammability of linear saturated polyesters such as poly(ethylene terephthalate) cannot be meaningfully evaluated according to the standard methods used for most polymers due to the softening and melting-out characteristics of the polyesters. For example, when the flame retardancy of poly(ethylene terephthalate) is evaluated according to the horizontal burning test ASTM D635, samples will pass the test regardless of whether or not a flame retardant additive is present because the ignited end melts and drops from the test specimen, thus prematurely removing the ignition front and leading to deceptive results. Likewise, in the measurement of combustion index according to the method of C. P. Fenimore and F. C. Martin, Combustion and Flame, 10, 135 (1966) melting of the polyester removes heat from the surface of the specimen and leads to unrealistically high results which do not accurately reflect the contribution of any flame retardant additive present. A similar phenomenon also occurs in the evaluation of flammability according to the vertical burning test UL746 (Standards for Thermoplastic Insulated Wires, 3rd edition, 17, 1948). However, by modifying test UL746 with respect to the size of the sample, height of flame and time of flame contact in order to moderate the effect of the drip characteristics of the polyester during ignition, it has been found that meaningful values which measure the actual contribution of the flame retardant additive can now be obtained. Accordingly, the adopted test was vertical burning test UL746 modified in the following three respects:

(1) the size of the test strip measured 3 inches x ¼ inch x ⅛ inch
(2) the ignition source was a ⅜ inch diameter Bunsen burner adjusted to produce a blue flame approximately ½ inch high, and
(3) the flame contact time with the free end of the test strip was 5 seconds.

The invention is further illustrated by the following examples wherein all parts and percentages are by weight unless otherwise specified. Throughout this specification the term "flame retardant" is used to designate a composition or article which will meet the requirements of ASTM D–635 and have a burn time of less than 60 seconds determined according to the modified vertical burning test UL–746 described above.

EXAMPLES 1 TO 6

In these examples various molding compositions were made by intimately blending poly(ethylene terephthalate) with the flame retardant(s) in an inline reciprocating screw injection molding machine using a barrel temperature of 285° C. and then compression molding the blends into plaques ⅛ inch x 3 inch x 3 inches long using a 4,000 p.s.i.g. press at 285° C. for 10 minutes. The plaques were then cut into the proper size strip for testing. The poly(ethylene terephthalate) used in these examples was a commercial poly(ethylene terephthalate) having an intrinsic viscosity of 0.61 (determined on a 1% solution in 60/40 phenol/tetrachloroethane at 25° C.). The bromine-containing polyether was poly[3,3-bis(bromomethyl)oxetane] containing 65.6% bromine. The polyether had a softening point of about 222° C. and was insoluble at 100° C. in cyclohexanone, toluene and α-chloronaphthalene. The antimony trioxide, when present, was in finely divided form and passed a U.S. Standard Sieve No. 200.

Details as to the amount of each component in the compositions and flame retardancy test results on the molded bars therefrom are given in the following Table I.

TABLE I

| | Composition (parts by weight) | | | Flame retardancy rating | |
|---|---|---|---|---|---|
| | Poly(ethylene terephthalate) | Poly[3,3-bis-(bromomethyl)-oxetane] | Antimony trioxide | Vertical burn test | ASTM D635 |
| Control A | 100 | | | >120 | Pass. |
| Example 1 | 98.4 | 1.6 | | >120 | Do. |
| Example 2 | 96.8 | 3.2 | | 30 | Do. |
| Example 3 | 93.75 | 6.25 | | 20 | Do. |
| Example 4 | 90.9 | 9.1 | | 10 | Do. |
| Example 5 | 97.6 | 1.6 | 0.8 | 25 | Do. |
| Example 6 | 95.2 | 3.2 | 1.6 | 5 | Do. |
| Control B | 99.2 | | 0.8 | [1] 95 | Do. |

[1] Average of 6 tests; results ranged from 60 to greater than 120 seconds.

EXAMPLES 7 TO 12

Molding compositions were prepared according to the general procedure of Examples 1 to 6 except that the compositions also contained from 30 to 33% by weight of glass fibers having an average length of 0.25 inch and a diameter of 0.0005 inch, and 0.1% of talc as a nucleating agent. The compositions were next dried at 130° C. for 16 hours and then molded into plaques according to the procedure of Examples 1 to 6. Flame retardancy test results on the molded bars therefrom are given in the following Table II.

TABLE II

|  | Composition (parts by weight) | | | | Flame retardancy rating | |
|---|---|---|---|---|---|---|
|  | Poly (ethylene terephthalate) | Glass | Poly [3,3-bis-(bromomethyl)-oxetane] | Antimony trioxide | Vertical burn test | ASTM D635 |
| Control C | 67.0 | 33.0 | | | >120 | Fail. |
| Example 7 | 65.5 | 32.8 | 1.6 | | >120 | Pass. |
| Example 8 | 64.5 | 32.3 | 3.2 | | 50 | Do. |
| Example 9 | 65.0 | 32.6 | 1.6 | 0.8 | 22 | Do. |
| Example 10 | 63.5 | 31.7 | 3.2 | 1.6 | 4 | Do. |
| Example 11 | 62.5 | 31.3 | 6.2 | | 7 | Do. |
| Example 12 | 60.6 | 30.3 | 6.1 | 3.0 | 2 | Do. |
| Control D | 65.5 | 32.9 | | 1.6 | >120 | Do. |

What I claim and desire to protect by Letters Patent is:

1. A flame retardant composition comprising a blend of a linear saturated polyester having an average molecular weight of at least about 10,000 and as a flame retardant, based on the weight of the compositiion, 3 to 15% of a bromine-containing polyether when said polyether is the sole flame retardant or 1 to 15% of said polyether combined with 0.5 to 5% of an antimony compound, said polyether having a weight average molecular weight of at least about 700 and a bromine content of at least 48% and being a polymer of

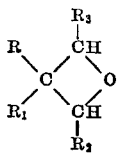

where R is a bromine substituted methyl group, $R_1$ is R, chloromethyl, alkoxymethyl or an alkyl group and $R_2$ and $R_3$ are hydrogen or an alkyl group, said alkoxy and alkyl groups containing from 1 to 18 carbon atoms.

2. The composition of claim 1 wherein the polyester is poly(ethylene terephthalate).

3. The composition of claim 2 wherein the polyether is a polymer of 3,3-bis(bromomethyl)oxetane.

4. The composition of claim 3 also containing by weight from 5 to 60% of a reinforcing filler.

5. The composition of claim 4 wherein the reinforcing filler is glass fibers.

6. The composition of claim 5 wherein the glass fibers are present in the amount of 20 to 40%.

References Cited

UNITED STATES PATENTS 3,031,425 4/1962 Schoepfle et al. __ 260—DIG 24
3,250,739 5/1966 Sauer et al. _____ 260—45.7 X
3,260,687 7/1966 Postol _____ 260—45.7 X LEWIS T. JACOBS, Primary Examiner U.S. Cl. X.R.
260—860, DIG 24